W. E. WINE

Sept. 16, 1930. HOPPER CAR CONSTRUCTION Re. 17,807

3 Sheets-Sheet 1

Original Filed Jan. 30, 1926

Inventor

William E. Wine

By Keller & Mechlin his Attorneys

W. E. WINE

Sept. 16, 1930. HOPPER CAR CONSTRUCTION Re. 17,807

3 Sheets-Sheet 2

Original Filed Jan. 30, 1926

Inventor:
William E. Wine
By Ritter & Mechlin
his Attorneys

Sept. 16, 1930.
W. E. WINE
HOPPER CAR CONSTRUCTION
Re. 17,807
Original Filed Jan. 30, 1926
3 Sheets-Sheet 3
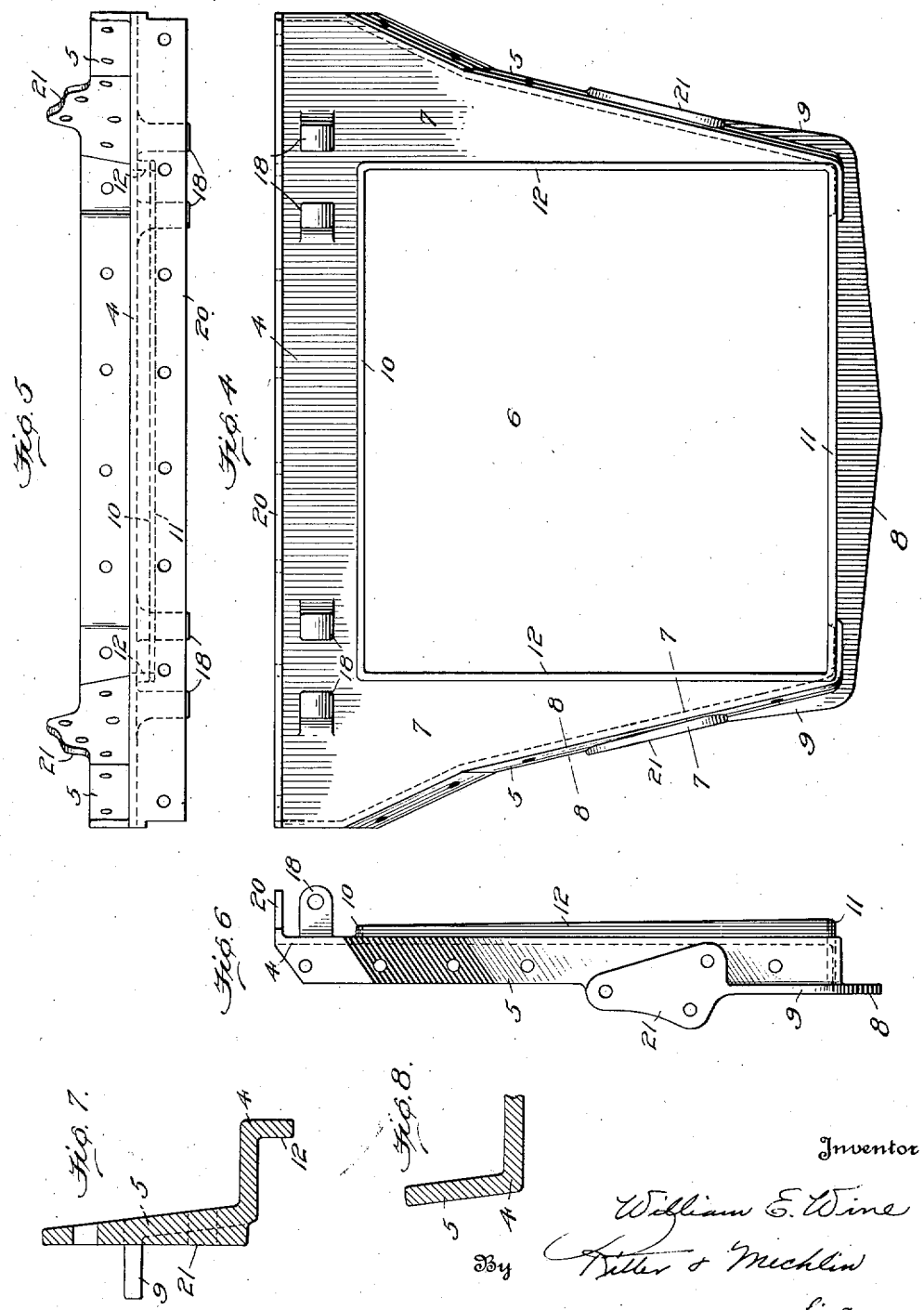
Inventor
William E. Wine
By Keller & Muchlin
his Attorneys Reissued Sept. 16, 1930 Re. 17,807

UNITED STATES PATENT OFFICE

WILLIAM E. WINE, OF TOLEDO, OHIO, ASSIGNOR TO WINE RAILWAY APPLIANCE COMPANY, OF TOLEDO, OHIO, A CORPORATION OF OHIO

HOPPER-CAR CONSTRUCTION

Original No. 1,705,147, dated March 12, 1929, Serial No. 84,970, filed January 30, 1926. Application for reissue filed July 26, 1930. Serial No. 471,047.

My invention relates to railway car hopper construction and more particularly to a hopper car door frame unit and the mode of combining the latter with the chute plate and side plates of a hopper and with the door for closing the lading discharge opening. The principal object of the invention is to strengthen and simplify car hoppers and to provide structural means which ensure that the doors shall efficiently and reliably function.

A primary feature of the invention consists in providing an inclined hopper having downwardly converging sides with a cargo discharge opening of substantially rectangular form, and in associating therewith a substantially rectangular hinged door for closing said opening.

A further feature of the invention consists in providing a car hopper door frame with a lading discharge opening which is bounded by outwardly projecting flanges, and in combining therewith a substantially rectangular hinged door having inwardly projecting flanges for cooperating with the corresponding flanges of the frame to form a seal therewith for preventing the escape of lading from the hopper.

Another feature of the invention involves a car hopper frame having a discharge opening and provided with outwardly projecting flanges adjacent the sides and lower edges of said opening, and in combining therewith a hinged door having inwardly projecting flanges for cooperating with the flanges of the frame, to form a seal with the latter for preventing the escape of lading from the hopper, the flanges at the sides of the discharge opening being tapered so as gradually to increase in height toward the lower edge of the opening.

A still further feature of the invention consists in the provision of a hopper car door frame of substantially trapezoidal form having a rectangular discharge opening.

Other features of the invention, residing in advantageous combinations of parts and details of construction, will hereinafter appear.

In the drawings illustrating a preferred embodiment of the invention, the scope whereof is pointed out in the claims:

Figure 4 is a detail elevational view of the door frame unit illustrating the preferred construction.

Figure 5 is a plan view of the door frame unit, and

Figure 6 is a side elevation thereof.

Figure 7 is a sectional view on the line 7—7, Fig. 4.

Figure 8 is a detail sectional view on the line 8—8, Fig. 4.

Figure 1:
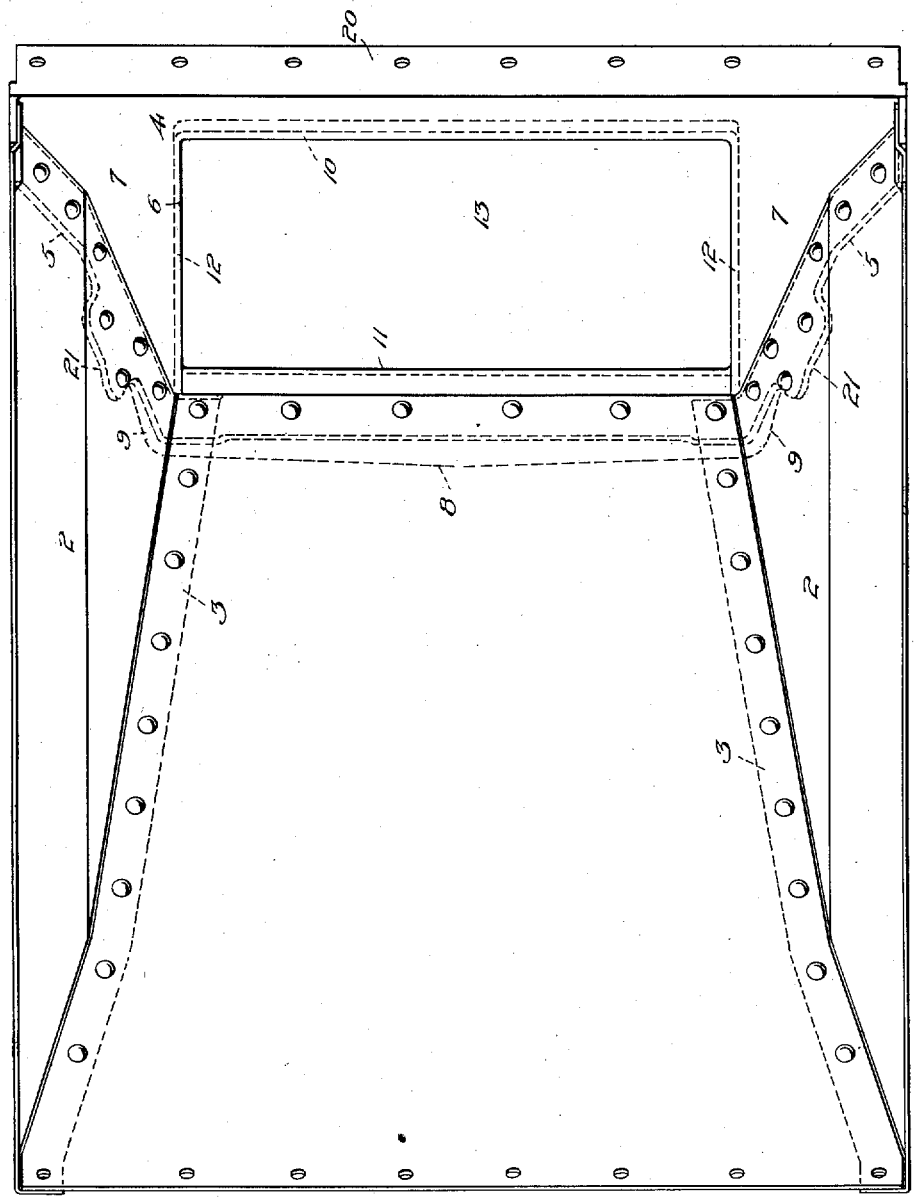
Figure 1 is a plan view of a railway car hopper embodying the invention.
Figures 2, 3:
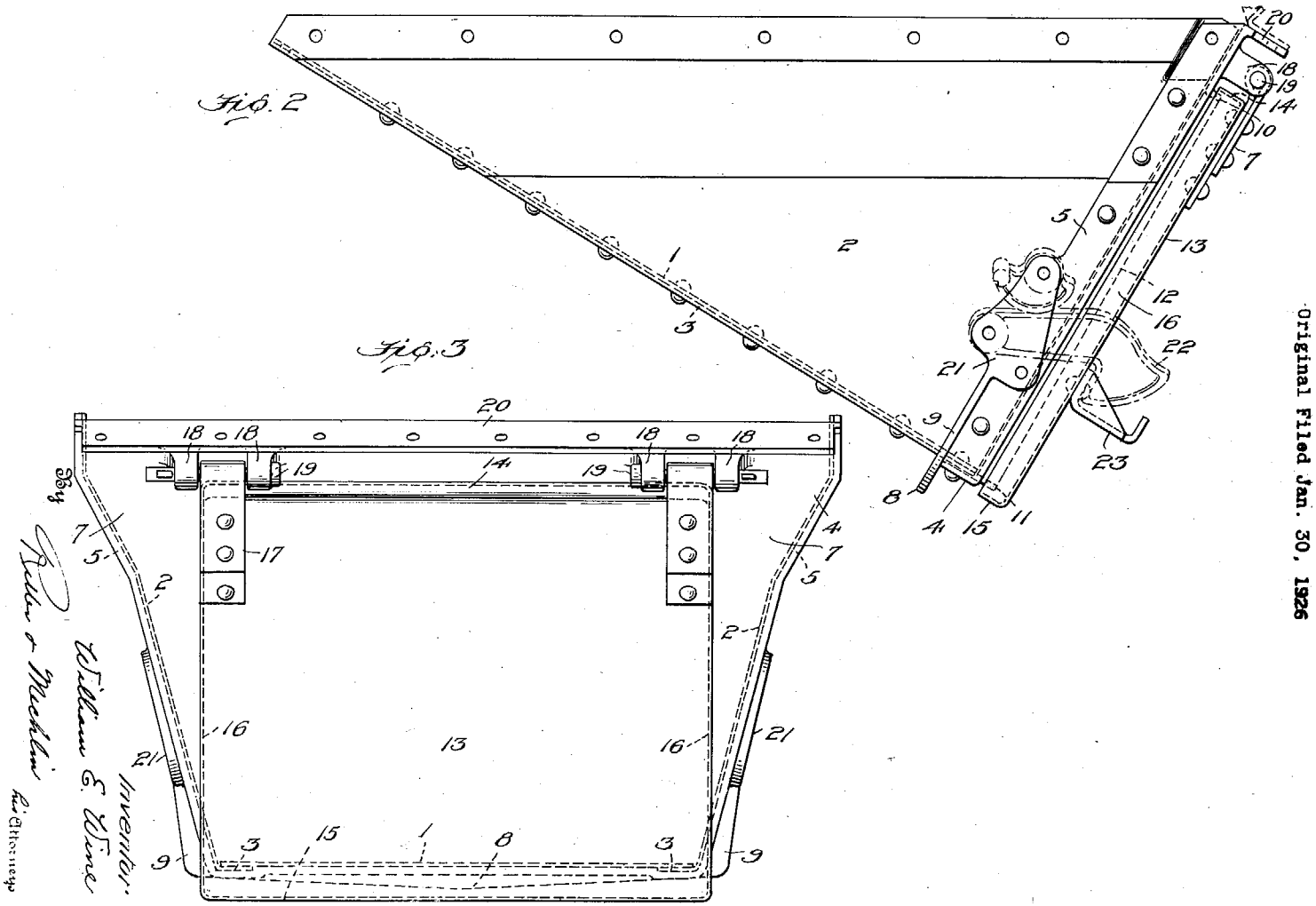
Figure 2 is a side elevational view of the construction shown in Fig. 1, a well known form of door locking mechanism for retaining the door of the hopper in closed position being indicated in dotted lines.
Figure 3 is an end elevational view of the hopper construction.

The general form of hopper illustrated in the drawings for the purpose of explaining the invention is well known; but it is to be understood that the particular configuration shown in the drawings is not essential, as modifications in the form of the hopper may obviously be made without departing from the scope of the claims defining the invention.

The hopper comprises an inclined bottom or chute plate 1 and sides 2 which customarily are formed of metal. The sides of the hopper converge downwardly and each is provided along its lower edge with an inwardly extending flange 3 which lies beneath and is riveted to the inclined bottom plate 1. The converging sides 2 of the hopper are, in the present instance, both inclined to the vertical, their lower segments being somewhat more steeply inclined.

Rigidly secured to the bottom plate 1 and side sheets 2 at the discharge end of the hopper, as by means of rivets, is a door frame 4 which may be formed as a steel casting. The door frame is preferably of substantially trapezoidal form and may advantageously be provided at its opposite sides with inwardly extending flanges 5 having openings for receiving rivets for attaching the side sheets of the hopper thereto. Each of the flanges has relatively inclined portions which intersect adjacent the upper part of the frame to form an indentation for accommodating projecting portions of neighboring parts of the car body. The frame is formed with a cargo discharge opening 6 which preferably is rectangular in shape, thereby providing on opposite sides of the opening generally triangular downwardly tapering plate-like portions 7 intervening between said discharge opening and the respective hopper side sheet 2. By this means increased strength and stiffness against distortion, especially toward the upper end of the door opening, are imparted to the hopper. In order to reinforce the lower part of the door frame the latter is provided with a flange 8 which passes under the door opening adjacent the inner or free edge of the portion of the frame secured to the slope or chute sheet 1 and extends upwardly a short distance at opposite sides of the frame adjacent the inner or free edges of the flanges 5, as indicated at 9. Thus it will be perceived that the reinforcing flange is disposed in a plane inwardly of the triangular portions 7 of the frame and consequently the lading discharge opening 6. This disposition of the flange 8 and its portions 9 serves not only to very efficiently reinforce the bottom portion and lower corners of the frame but, due to the fact that the frame forms an oblique angle with the vertical when associated with the hopper, the reinforcing members will not project or extend beyond the clearance limits or lines prescribed by the railroads notwithstanding that the frame may be of maximum size.

Formed on the frame 4 and bordering the car door discharge opening are outwardly projecting flanges for cooperating with flanges upon the door to form a seal against the escape of fine lading. These flanges preferably completely define the discharge opening, the uppermost flange 10 projecting outwardly a somewhat less distance than the lower flange 11 and the two side flanges 12, 12 being tapered so as to increase in height toward the lower edge of the opening. The hinged door 13 for closing the hopper discharge opening is of rectangular form and may advantageously be of pressed sheet metal type so as to provide inwardly extending marginal flanges 14, 15 and 16 which not only stiffen the door but also cooperate with the flanges 10, 11 and 12 of the door frame to prevent the escape of fine lading. Suitable means are provided for hinging the door, such means preferably consisting of hinge members 17 overlying the outer face of the door and riveted thereto adjacent the upper corners of the latter. The upper ends of these hinge members extend between spaced hinge lugs 18 with which the door frame is integrally provided above the cargo opening. The hinge pins 19 pass through corresponding openings in the hinge members 17 and 18, thus securing the door to the frame member 4. The upper end of the frame above the hinge lugs may advantageously be fashioned with an outwardly projecting flange 20 adapted to permit said frame to be secured at its upper end to a neighboring portion of the car body, and this flange also serves as a guard or protection to the hinge lugs.

The side flanges 5 of the door frame unit preferably overlie the side sheets 2 of the hopper instead of extending between the latter, as such a construction permits the frame to be formed with an integral bracket 21 conveniently providing for the mounting of the door locking means. In the present instance two such brackets 21 are illustrated, one on each side of the hopper. They are of a form suitable for permitting the use of a pivoted door supporting hook 22 which cooperates in a well known manner with a bracket or arm 23 secured to the door. As the flange portions 9 of the reinforcing member 8 are disposed adjacent the inner or free edges of the flanges 5 and since, as may be seen from the drawings, they merge into and terminate adjacent the brackets 21 the latter are effectively reinforced against strains and torsional moments which may be imparted to them from the door supporting mechanism.

Although the frame and hopper construction described are symmetrical so as to eliminate "lefts" and "rights" it will be readily understood that the invention is not limited in this respect. In other words, in the design of many cars to which the frame may be applied it will be found advantageous to only mount one door supporting hook on the frame and that it will be necessary to only form one edge of the frame with an indentation to accommodate neighboring projecting portions of the car. Under these conditions the frame and hopper construction may be modified or changed to accord with existing car designs without losing the advantages and benefits inherent in the construction described and without departing from the spirit of the invention as defined by the claims.

I claim:

1. A hopper car door frame having a lading discharge opening and provided with outwardly projecting flanges adjacent the sides and lower edge of said opening, the flanges at the sides of the opening being of increased height adjacent the lower edge of the opening, in combination with a hinged door having inwardly projecting flanges for cooperating with the outwardly projecting flanges of the frame to form a seal therewith for preventing the escape of lading from the car hopper.

2. A hopper car door frame having a lading discharge opening and provided with outwardly projecting flanges bordering said opening, in combination with a hinged door for closing said opening, said door having inwardly projecting flanges adapted to overlap the flanges of the door frame to form a seal therewith for preventing the escape of lading from the car hopper, the overlapping portions of corresponding parts of the respective flanges being less at the hinged edge of the door than at the opposite free edge thereof.

3. A hopper car door frame having a rectangular discharge opening, said frame being provided with flanges bordering said opening and being further provided on opposite sides of said opening with rigidly connected portions of substantially triangular form to which the side sheets of the car hopper are adapted to be attached, in combination with a hinged rectangular door for closing said opening, said door having flanges adapted to overlap the flanges of the door frame to form a seal therewith for preventing the escape of lading from the hopper, the overlapping portions of corresponding parts of the respective flanges being less at the hinged edge of the door than at the free edge thereof.

4. A unitary hopper car door frame of substantially trapezoidal form having a rectangular lading discharge opening therein, in combination with a hinged rectangular door for closing said opening, said door being fashioned with inwardly projecting flanges adapted to overlap portions of the door frame above and below said opening for preventing the escape of lading from the car hopper, the overlapped portion of the door frame below the opening being greater than the overlapped portion above the opening.

5. A hopper car door frame of substantially trapezoidal form having a rectangular lading discharge opening and provided with outwardly extending flanges adjacent said opening, in combination with a hinged rectangular door for closing said opening, said door being provided with inwardly extending flanges for cooperating with the flanges of the frame to form a seal therewith for preventing the escape of lading from the car hopper, the flanges of the frame being of greatest depth at points remote from the hinged edge of the door.

6. A unitary hopper car door frame having a lading discharge opening and being provided on opposite sides of said opening with flanges for the attachment of the side sheets of a car hopper, one of said flanges having relatively inclined portions forming an indentation to accommodate a neighboring portion of the car body.

7. A unitary hopper car door frame having a lading discharge opening and provided with inwardly projecting flanges for the attachment to the side sheets of a car hopper, one of said flanges being indented intermediate its ends to accommodate neighboring portions of the car body.

8. A unitary hopper car door frame having a lading discharge opening, one side edge of said frame being indented to accommodate a neighboring portion of the car body.

9. A unitary hopper car door frame having a lading discharge opening, the opposite side edges of said frame being indented to accommodate neighboring portions of the car body.

10. Hopper car construction involving a hopper having an inclined bottom and downwardly converging sides and being formed at its lower end with a lading discharge opening, one of said sides having relatively inclined intersecting portions forming an indentation for accommodating a neighboring portion of the car body.

11. A hopper car construction involving a hopper having an inclined bottom and inclined downwardly converging sides and being formed at its lower end with a lading discharge opening, each of said downwardly converging sides having relatively inclined intersecting portions forming an indentation for accommodating projecting portions of neighboring parts of the car body.

12. A hopper car door frame constructed as a unit and having a substantially rectangular discharge opening and inwardly extending downwardly converging flanges for attaching the side sheets of a hopper to the frame, one of said flanges being integrally formed with a bracket portion adapted to form a mounting for a pivoted door supporting hook, the lower portion of said frame being integrally formed with a laterally projecting reinforcing flange extending beneath the door opening and merging adjacent one end into said bracket portion.

13. A hopper car door frame constructed as a unit and having a substantially rectangular discharge opening and inwardly extending downwardly converging flanges for attaching the side sheets of a hopper to the frame, one of said flanges being integrally formed with a bracket portion adapted to form a mounting for a pivoted door supporting hook, the free edge of the lower portion of said last-named flange being integrally formed with a laterally projecting reinforcing flange one end of which terminates adjacent said bracket portion.

14. A hopper car door frame constructed as a unit and having a substantially rectangular discharge opening and inwardly projecting flanges for attaching the side sheets of a hopper to the frame, said frame being fashioned with a plate-like portion of substantially triangular shape intermediate one of said flanges and the adjacent edge of the discharge opening, said last-named flange being integrally provided with a bracket portion adapted to form a mounting for a pivoted door supporting hook and the lower portion of said flange being also provided adjacent its free edge with a laterally projecting reinforcing flange one end of which terminates adjacent said bracket portion.

15. A hopper car door frame constructed as a unit and having a substantially rectangular discharge opening, said frame being integrally provided on opposite sides with brackets adapted to form mountings for pivoted door supporting hooks, the lower portion of said frame being fashioned with a reinforcing flange extending beneath the door opening and merging into said brackets.

16. A hopper car door frame having a substantially rectangular discharge opening and two downwardly converging inwardly extending flanges for attaching the side sheets of a hopper to the frame, said frame being provided with a plate-like portion of substantially triangular shape intermediate one of said flanges and the adjacent edge of the discharge opening, the lower portion of said frame being integrally formed with a downwardly extending reinforcing flange spaced inwardly from said plate-like portion.

17. A hopper car door frame having a substantially rectangular discharge opening and two downwardly converging inwardly extending flanges for attaching the side sheets of a hopper to the frame, said frame being provided with a plate-like portion of substantially triangular shape intermediate one of said flanges and the adjacent edge of the discharge opening, the free edge of the lower portion of said last-named flange being integrally formed with a laterally projecting reinforcing flange.

18. A hopper car door frame having a substantially rectangular discharge opening and two downwardly converging inwardly extending flanges for attaching the side sheets of a hopper to the frame, the free edge of the lower portion of each of said flanges being integrally formed with a laterally projecting reinforcing flange.

19. Hopper car construction comprising a hopper having a slope sheet and downwardly converging side sheets, a door frame having a substantially rectangular discharge opening and provided with inwardly extending flanges respectively attached to the slope sheet and to the side sheets of the hopper, said slope sheet attaching flange and the lower portion of each of said side sheet attaching flanges being integrally formed adjacent their inner edges with a continuously extending laterally projecting reinforcing flange.

20. Hopper car construction comprising a hopper having a slope sheet and downwardly converging side sheets, a unitary door frame having a substantially rectangular discharge opening and provided with inwardly extending flanges respectively attached to the slope sheet and side sheets of the hopper, the slope sheet attaching flange being integrally formed adjacent its inner edge with a downwardly projecting reinforcing flange.

21. Hopper car construction comprising a hopper having a slope sheet and downwardly converging side sheets, a door frame having a substantially rectangular discharge opening and provided with inwardly extending flanges respectively attached to the slope sheet and side sheets of the hopper, said frame being provided with a plate-like portion of substantially triangular shape intermediate one of said side sheet attaching flanges and the adjacent edge of the discharge opening, said slope sheet attaching flange and the lower portions of said side sheet attaching flanges being integrally formed with a laterally projecting reinforcing flange disposed in a plane spaced inwardly from said triangularly shaped plate-like portion.

22. A unitary hopper car door frame having a lading discharge opening and provided with inwardly projecting flanges for attaching the side sheets of a hopper to the frame, the inner edge of portions of said attaching flanges terminating in a laterally projecting stiffening flange.

23. A unitary hopper car door frame having a lading discharge opening and provided with outwardly projecting flanges adjacent said opening and with oppositely projecting flanges for attaching the side sheets of a hopper to the frame, portions of said attaching flanges terminating in a stiffening flange disposed in a plane substantially normal thereto.

24. A hopper car door frame having a discharge opening, in combination with a hinged door for closing said opening, said door having flanges for overlapping portions of the door frame bordering said opening to prevent the escape of lading from a car hopper, the overlapped portion of the door frame below the opening being greater than the overlapped portion thereof above the opening.

25. A hopper car door frame having a lading discharge opening and provided with outwardly projecting flanges bordering said opening, in combination with a hinged door for closing the latter, said door being provided with flanges for overlapping the said flanges of the door frame to prevent the escape of lading from a car hopper, the overlapping portions of corresponding parts of the respective flanges being less at the hinged edge of the door than at the opposite free edge thereof.

26. A hopper car door frame having a lading discharge opening and provided with outwardly projecting flanges bordering the opening, in combination with a hinged door having inwardly projecting flanges for overlapping the flanges of the frame to prevent the escape of lading, the flange of the door frame adjacent the free edge of the door projecting outwardly to a greater extent than the flange of the door frame adjacent the opposite hinged edge of the door.

WILLIAM E. WINE.